United States Patent
Howard et al.

(10) Patent No.: US 11,869,319 B2
(45) Date of Patent: Jan. 9, 2024

(54) FIXED RETAIL SCANNER WITH ANNOTATED VIDEO AND RELATED METHODS

(71) Applicant: Datalogic USA, Inc., Eugene, OR (US)

(72) Inventors: Brett Howard, Eugene, OR (US); Aric Zandhuisen, Eugene, OR (US); Matt Monte, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 115 days.

(21) Appl. No.: 17/646,278

(22) Filed: Dec. 28, 2021

(65) Prior Publication Data
US 2022/0207969 A1 Jun. 30, 2022

Related U.S. Application Data

(60) Provisional application No. 63/132,855, filed on Dec. 31, 2020.

(51) Int. Cl.
| | |
|---|---|
| *G07G 1/00* | (2006.01) |
| *G06N 20/00* | (2019.01) |
| *G06F 40/169* | (2020.01) |
| *G06Q 20/20* | (2012.01) |

(52) U.S. Cl.
CPC ......... *G07G 1/0045* (2013.01); *G06F 40/169* (2020.01); *G06N 20/00* (2019.01); *G06Q 20/208* (2013.01); *G07G 1/0018* (2013.01)

(58) Field of Classification Search
CPC .... G07G 1/0045; G06F 40/169; G06N 20/00; G06Q 20/208
See application file for complete search history.

(56) References Cited

U.S. PATENT DOCUMENTS

| | | | |
|---|---|---|---|
| 5,739,512 A * | 4/1998 | Tognazzini | G07G 5/00 235/380 |
| 6,533,168 B1 * | 3/2003 | Ching | G06Q 20/047 235/375 |
| 7,646,922 B2 | 1/2010 | Au et al. | |
| 7,881,537 B2 * | 2/2011 | Ma | G06V 40/25 382/103 |
| 8,430,318 B2 | 4/2013 | McQueen et al. | |
| 8,496,177 B2 | 7/2013 | Sevier et al. | |

(Continued)

FOREIGN PATENT DOCUMENTS

EP 2320350 A1 5/2011

OTHER PUBLICATIONS

European Patent Office, Extended European Search Report in EP Application No. 21218294.3, dated May 16, 2022, 7 pages.

*Primary Examiner* — Thien M Le
*Assistant Examiner* — Asifa Habib
(74) *Attorney, Agent, or Firm* — Stoel Rives LLP

(57) ABSTRACT

A fixed retail scanner and related methods comprises imagers configured to capture image data, and a processor operably coupled to the imagers. The processor configured to provide image data from at least some of the imagers in real-time during a transaction to a decoder within the data reader for decoding an optical code on an object within the image data, generate annotations for the image data based on an analysis of image content of the image data to generate annotated image data, and provide the annotated image data from at least some of the imagers to an external system in real-time during the transaction.

20 Claims, 7 Drawing Sheets

(56) References Cited

U.S. PATENT DOCUMENTS

| | | |
|---|---|---|
| 9,004,359 B2 | 4/2015 | Shearin et al. |
| 9,305,198 B2 | 4/2016 | Thompson et al. |
| 9,342,723 B2 | 5/2016 | Liu et al. |
| 9,489,558 B2 | 11/2016 | Sevier et al. |
| 9,734,377 B2 | 8/2017 | Sevier et al. |
| 10,049,247 B2 | 8/2018 | Gao |
| 10,248,896 B2 | 4/2019 | Gao et al. |
| 10,970,501 B2 | 4/2021 | Gao |
| 10,970,502 B2 | 4/2021 | Canini et al. |
| 2007/0052734 A1* | 3/2007 | Skinner ............ G06T 19/00 345/689 |
| 2009/0295544 A1* | 12/2009 | Bayer ............ G06Q 10/08 235/492 |
| 2010/0127013 A1* | 5/2010 | Butler ............ G06Q 20/18 221/199 |
| 2012/0094258 A1* | 4/2012 | Langheier ............ G16H 20/30 434/127 |
| 2013/0048706 A1 | 2/2013 | Nahill et al. |
| 2013/0327831 A1 | 12/2013 | Howard |
| 2014/0082465 A1* | 3/2014 | Jee ............ G06F 40/166 715/202 |
| 2014/0108963 A1* | 4/2014 | Black ............ G06F 3/04845 715/753 |
| 2018/0204562 A1* | 7/2018 | Gong ............ G06V 10/82 |
| 2018/0247292 A1 | 8/2018 | Crooks et al. |
| 2019/0073499 A1* | 3/2019 | Hardin ............ G06K 7/1091 |
| 2020/0012888 A1* | 1/2020 | Lian ............ G06V 20/70 |
| 2020/0125812 A1 | 4/2020 | Canini et al. |
| 2020/0265231 A1* | 8/2020 | Li ............ G06V 20/20 |
| 2021/0142112 A1* | 5/2021 | Van Oldenborgh .. G06F 18/217 |
| 2022/0092338 A1* | 3/2022 | Yang ............ G06V 10/82 |
| 2023/0177391 A1* | 6/2023 | Packwood ............ G06V 20/52 706/12 |
| 2023/0186601 A1* | 6/2023 | Hartley ............ G06K 7/1447 382/103 |

\* cited by examiner

FIXED RETAIL SCANNER WITH ANNOTATED VIDEO AND RELATED METHODS

PRIOR APPLICATION

This application claims the benefit of U.S. Provisional Application No. 63/132,855, filed Dec. 31, 2020, and entitled "FIXED RETAIL SCANNER WITH ANNOTATED VIDEO AND RELATED METHODS," the disclosure of which is incorporated by reference herein in its entirety.

TECHNICAL FIELD

The present disclosure relates generally to scanners or code readers, and more particularly, to fixed retail scanners configured to provide annotated video to external devices or systems.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner comprises one or more imagers configured to capture image data and a processor operably coupled to one or more of the imagers. The processor configured to provide image data from at least some of the imagers in real-time during a transaction to a decoder within the data reader for decoding an optical code on an object within the image data, generate annotations for the image data based on an analysis of image content of the image data to generate annotated image data, and provide the annotated image data from at least some of the imagers to an external system in real-time during the transaction.

A method of generating annotated image data for fixed retail scanner comprises capturing image data from a plurality of imagers during a real-time transaction in a retail environment; communicating at least some of the image data to a decoder within the data reader for decoding an optical code on an object within the image data; generating annotations for at least some of the image data based on an analysis of image content of the image data; creating annotated image data with the annotations and the image data; and transmitting the annotated image data to a remote system that is external to the fixed retail scanner for additional analysis or manual inspection.

DETAILED DESCRIPTION

Figure 1:
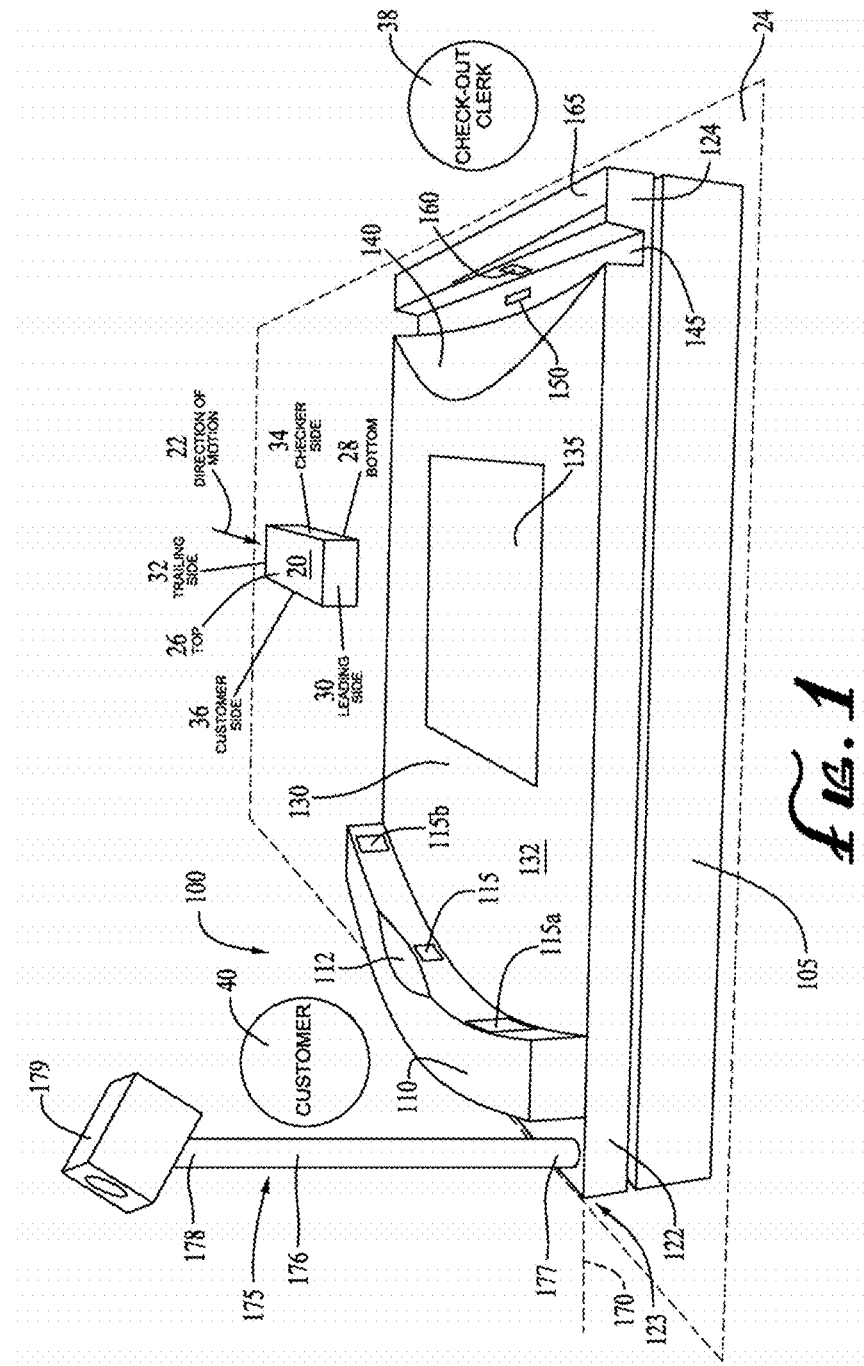
FIG. 1 illustrates a data reader and an exemplary item/object that may be passed through a view volume of the data reader.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top down reader imagers, security imagers, etc.) that may also provide image data to the fixed retail scanner and/or remote systems.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READE," U.S. Pat. No. 10,248,896, issued Apr. 2, 2019, and entitled "DISTRIBUTED CAMERA MODULES SERIALLY COUPLED OT COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device.

FIG. 1 illustrates a data reader 100 and an exemplary item/object 20 that may be passed through a view volume of the data reader 100. The view volume may be a function of the enclosure and style of the data reader 100 and the perspectives of the views in which images of the object 20 are captured. A perspective may encompass a location, direction, angle, or any combination of the foregoing, or the like, that characterizes a vantage or point of view for seeing, imaging, visualizing via machine vision, or illuminating a part or whole of the object 20. The data reader 100 may be installed in a retail environment (e.g., grocery store), which typically is disposed within a counter or other support structure of an assisted checkout lane or a self-checkout lane.

For general purposes of description, the object 20 is represented as a rectangular six-sided polyhedron, such as a cereal box (hereinafter referred to as a box-shaped item, package or object) having a top side 26, a bottom side 28, a leading side 30, a trailing side 32, a checker side 34, and a customer side 36. In some instances, the object 20 may be described with respect to its direction of motion 22 across a generally horizontal surface 132 of a cover or platter 130, thus the following descriptions regarding the position of the checker 38 and the customer 40 are provided to facilitate description and establish a frame of reference related to typical/example positions of the customer 40 and an operator (e.g., a checkout clerk 38), as illustrated in FIG. 1, and are not intended to be limiting. The box-shaped item is illustrated as being passed through a read region across the surface of the platter 130 and above the window 135 and to the sides of windows 115 *a*, 115 *b*. The illustrated example shows the direction of motion 22 of the object 20 being in a right-to-left scheme (from the vantage of the checker 38), but other directions such as left-to-right are applicable. It should be understood that the data reader 100 may be used without a checkout clerk 38, and/or the customer 40 (or clerk 38) may be positioned at any side of the data reader 100. In addition, the object 20 is described as a box-shaped package for convenience, but it should be understood that the object 20 may encompass other shapes, including, for example, round cans or irregularly shaped packages, such as a bag of oranges, potato chips, or the like.

The data reader 100 includes a frame, which may include a lower housing section 105 and an upper cover or platter section 130. In some embodiments, a portion or all of the cover or platter section 130 may be a weigh platter operable for weighing the object 20. The data reader 100 is typically installed into a countertop or work surface of the checkout stand 24 up to the level of the horizontal surface 132 of the platter 130 indicated by dashed line 170. The checkout clerk 38 typically stands or sits adjacent to a checker end 124, and away from opposing customer end 122, and moves objects 20 across the horizontal surface 132 in the direction of motion 22. Read modules or imagers view objects 20 being moved past the view volumes of the scan windows 115, 135, 160, and 180. Because the end 122 of the data reader 100 is on the side away from the checkout clerk 38, it is possible to provide a small, vertically-protruding section 110, which may house or contain a read module or imager with a view (or multiple views) through window 115. Additional imagers may be provided at different positions along the vertical section 110. In other embodiments, the imagers may not be housed within the vertically-protruding section 110, but instead housed within the lower housing section 105 and operable to read through the window 115 by using one or more mirrors to direct a field of view through the window 115.

The read module with a view (or multiple views) through window 115 is operative for viewing codes on item surfaces facing away from the checkout clerk 38 (such as customer side 36), without interfering with the checkout clerk's 38 limbs while the object 20 is moved through the read volumes. For viewing codes on the checker side 34, the top surface 165 of the end section 124 may be at the same level 170 as the horizontal surface 132 of the platter 130. To adequately read codes on the checker side 34 of the object 20, a gentle depression 140 is disposed in the otherwise horizontal surface 132 of the platter 130, extending from a position proximate the window 135 along a downward slope toward the checker end 124. The depression 140 allows the reading module(s) with view(s) through window 160 to view down to very near the bottom of the object 20 being scanned.

The data reader 100 may further include an upper reader module, in this embodiment configured as a top-down reader (TDR) 175 comprising an upwardly extending post body or section 176 extending along a vertical axis that may be generally perpendicular in relation to the horizontal surface 132 of the platter 130. The TDR 175 includes a vertically elongated post section 176 having a first mounting end 177 and an opposing second end 178. The post section 176 may be mounted or otherwise secured to the platter 130 or to the lower housing section 105 adjacent the first end 177 and includes a housing structure 179 supported adjacent the second end 178. The housing structure 179 is sized and dimensioned to house the imager(s) or read module 181 operable for capturing a top down view of the object 20 as well as potentially providing (from its orientation as shown in FIG. 1) some additional reading capability of the leading side 30 and/or the customer side 36. Additional details of the imager 181 and its components are discussed below with reference to FIGS. 2 and 3.

The TDR 175 extends to a height position at least equal to or above the vertically-protruding section 110 to effectively capture a top down view of the top surface 26 of the object 20. In one embodiment, the post 176 is positioned adjacent the customer end 122 in a corner structure 123 behind the vertically-protruding section 110 of the data reader 100. In other embodiments, the post 176 may be positioned at any other desired location on the platter 130. For instance, the post 176 may instead be on an opposite corner of the data reader 100, such as behind window 115 b (for optimizing left to right object sweep performance), behind window 115 (for symmetric sweep performance), or arranged at any position behind the vertically-protruding section 110. In some embodiments, the post 176 may be supported on and extend from the vertically-protruding section 110 instead of extending from the horizontal surface 132 of the platter 130. In other embodiments, the post 176 may be mounted to the lower housing section 105 through a hole or cutout in the platter. Although the TDR 175 is illustrated as being adjacent the customer 40, in another arrangement, the TDR 175 may instead be positioned near the check-out clerk 38. In such embodiments, it may be advantageous to position the TDR 175 so as to avoid interfering with the range of motion or visibility of the checkout clerk 38, thus the TDR 175 is illustrated as being outside the typical item path across the platter 132. It should be understood that the described arrangements are meant only to illustrate example embodiments and other arrangements for the TDR 175 and post 176 not specifically described herein may be possible without departing from the principles of the disclosure.

Imagers within the data reader 100 (including within the lower housing section 105, upper housing section 130, TDR 175, and/or other external peripherals) may include monochrome imagers and/or color imager depending on the particular application or desired capabilities of the scanner. The scanner may be configured to read and decode optical codes, such as 1D and 2D codes as well as high density codes, Dot codes, watermarking (e.g., Digimarc), optical character recognition (OCR), and other visual code and image recognition techniques for identifying an object. In some embodiments, the scanner may include communication modules configured for communication with peripherals, point of sale systems, and/or remote analysis systems, via communication technologies and protocols known by those skilled in the art.

Figure 2:
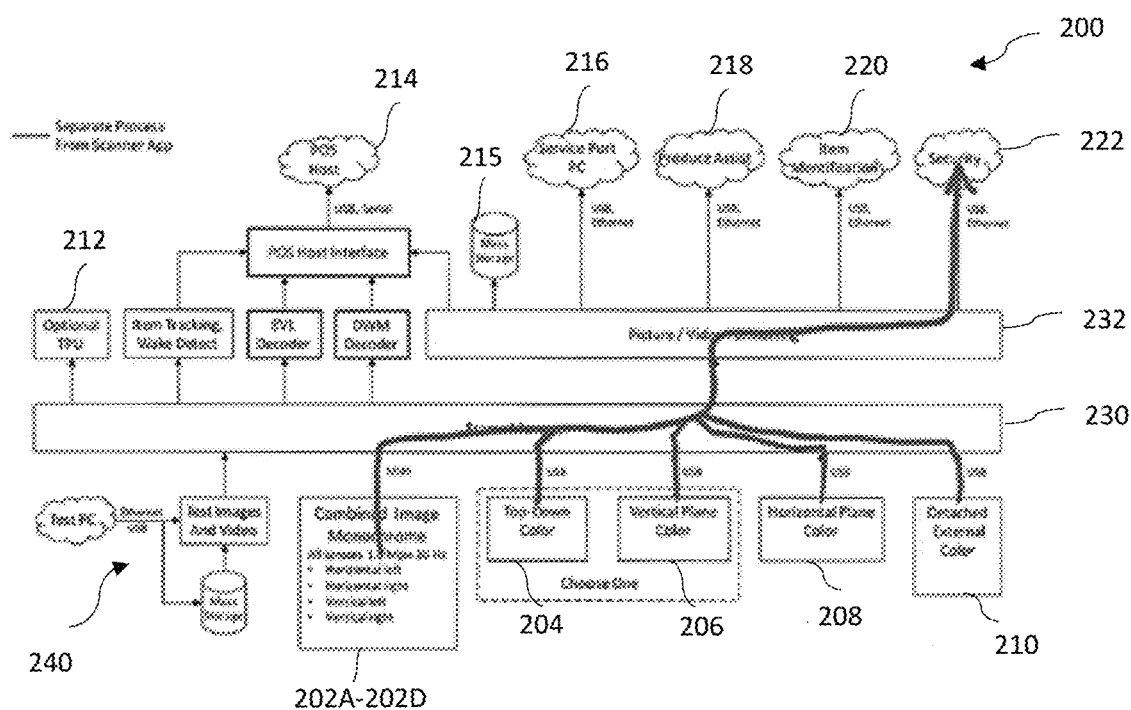
FIGS. 2-4 show different situations in which the frame manager directs image data from various imagers to a remote security system.
Figure 3:
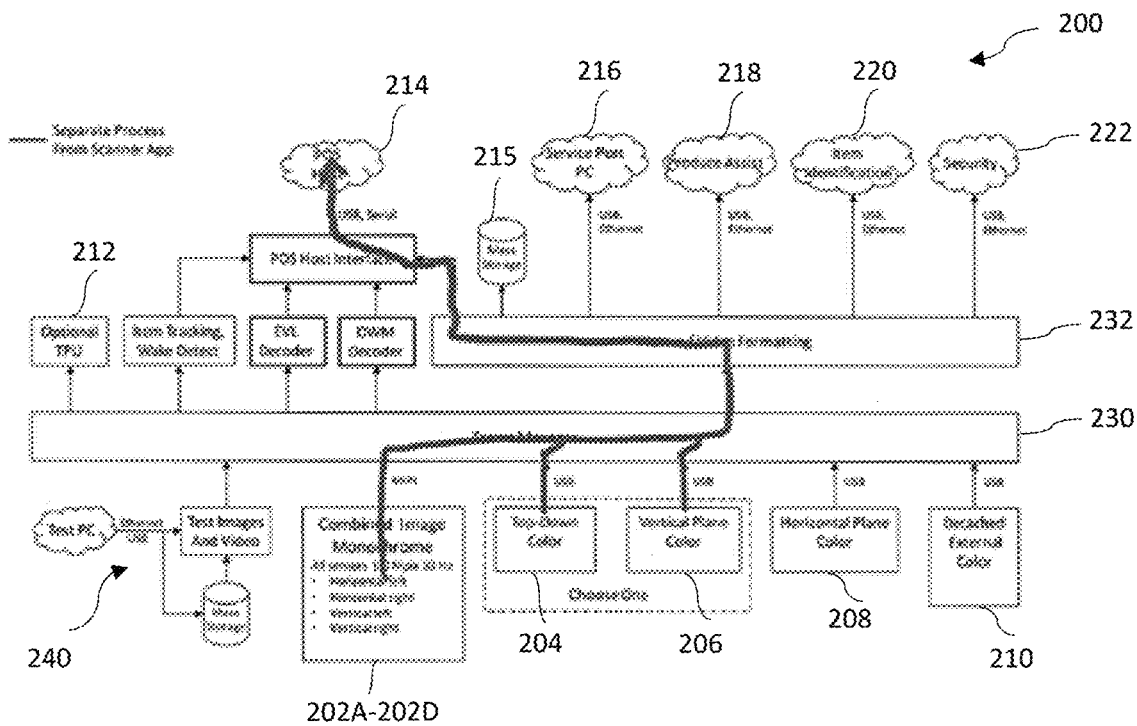
Figure 4:
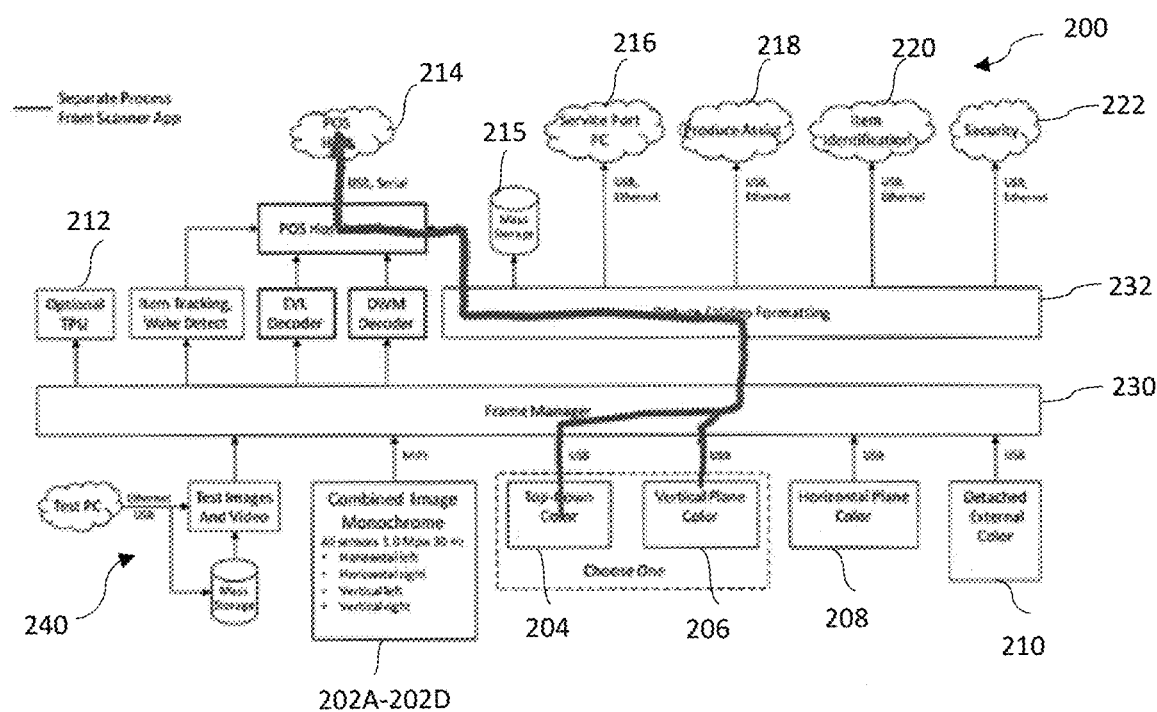

FIGS. 2-4 are simplified block diagrams 200, 300, 400 showing image data flow within the software environment of the data reader 100 according to an embodiment of the disclosure. The data reader 100 may include a one or more imagers such as a first set of imagers (e.g., monochrome imagers) disposed within the vertical housing of the data reader and one or more imagers such as a second set of imagers (e.g., monochrome imagers) disposed within the horizontal housing of the data reader. These imagers are referenced together as element 202 as a combined image as will be discussed further below. One or more color imagers 204, 206, 208, 210 may also be provided. In some embodiments, a color imager 208 may be provided in the horizontal housing of the data reader 100. In some embodiments, a color imager 206 may be provided in the vertical housing of the data reader 100. In some embodiments, a color imager 204 may be provided in the TDR 175 (FIG. 1) of the data reader 100. In some embodiments, a color imager 210 may be provided in an external peripheral that may be detached from the data reader 100. Some embodiments may include any combination of such color imagers. Likewise, some such devices (e.g., TDR and/or external imagers) may include monochrome imagers depending on a desired application for a particular environment. Such imagers 202, 204, 206, 208, 210 may be coupled to the processor(s) of the data reader 100 to provide and send image data (via a frame manager 230 and other formatting processes 232) to various destinations, including a tensor processing unit (TPU—internal to the data reader or cloud based) 212, a POS host 214, internal storage 215, a service port PC 216, a produce assist system 218, an item identification system 220, a security system 222, any other remote system or combinations thereof.

In some embodiments, monochrome imagers may be primarily used for barcode/watermark reading whereas color images may be primarily used for item recognition where color may be advantageous for the processing and detection of items based of color features, such as produce recognition, item recognition or verification, security analysis. Such analysis may be performed by local (e.g., TPU 212) and/or remote processors (e.g., produce assist system 218, item identification system 220, security system 222) that may contain an artificial intelligence (AI) engine or otherwise configured to perform other machine learning techniques.

Other processes are shown, such as processes for item tracking or wake-up detection, as well as decoding processes (shown as EVL decoder, DWM decoder). The decoding processes may decode barcodes (e.g., 1D barcodes, 2D barcodes, etc.) as well as other encoded indicia such as watermarks (e.g., Digimarc). Monochrome and/or color images may be provided to these decoding processes to perform such decoding and provide the result to the POS host 214 according to methods known in the art.

FIG. 2 shows one situation in which the frame manager 230 directs image data from all imagers 202, 204, 206, 208, 210 to the remote security system 222. FIG. 3 shows one situation in which the frame manager 230 directs image data from the monochrome imagers 202, the top-down reader 204, and the vertical plane color imager 206 to the POS host 214 (via the POS host interface). As a result, the POS host 214 may have access to actual image data as permitted opposed to just decoding information from the decoders of the data reader 100. FIG. 4 shows another situation in which just the color image data of the top-down reader 204 and the vertical plane color imager 206 are provided to the POS host 214 via the POS host interface. Of course, other combinations of monochrome and color image data may be provided to any of the POS host 214, the service port PC 216, the product assist system 218, the item identification system 220, and/or the security system 222 as desired for the particular application.

Figure 5:
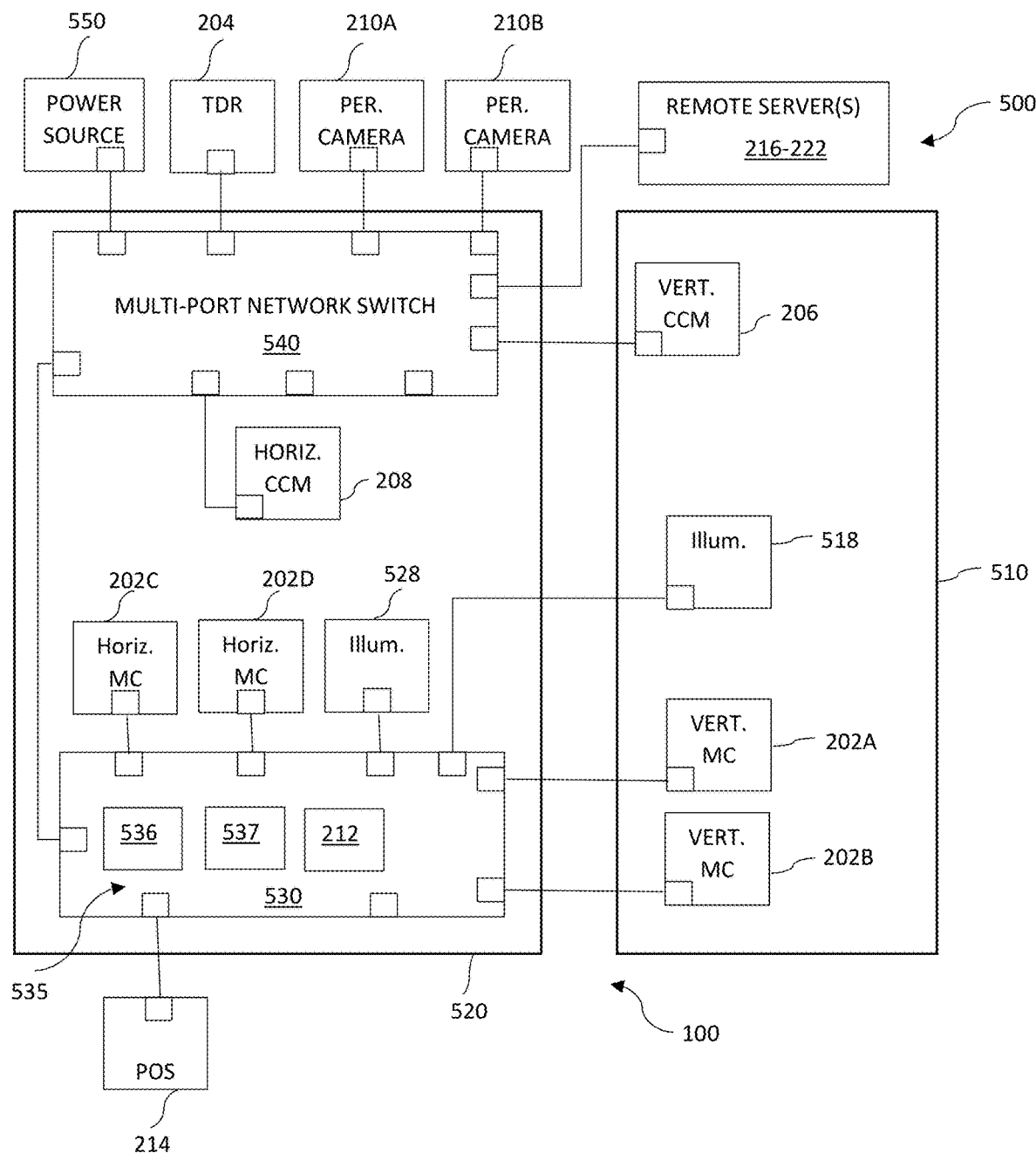
FIG. 5 is a simplified block diagram of a data reading system according to an embodiment of the disclosure.

FIG. 5 is a simplified block diagram of a data reading system 500 according to an embodiment of the disclosure. The data reading system 500 may include a data reader 100 that may be operably coupled with one or more of a power source 550, the top-down reader (TDR) 204, peripheral cameras 210A, 210B, one or more remote service that may provide one or more remote operation or analysis (e.g., service port PC 216, produce assist 218, item identification 220, security 222), and/or the POS) system 214.

The data reader 100 may be a bi-optic fixed retail scanner having a vertical housing 510 and a horizontal housing 520 as discussed above, though it is recognized that some embodiments may include a single plane fixed retail scanner. The vertical housing 510 may include a structure that provides for one or more camera fields of view (through a vertical window) within a generally vertical plane across the read zone of the data reader 100. The vertical structure provides an enclosure for one or more cameras 202A, 202B, 206, active illumination elements 518 (e.g., LED assemblies), and other optical elements (e.g., lenses, mirrors, etc.) and electrical elements (e.g., cables, circuit boards, etc.) therein. The horizontal housing 520 may include a structure that provides for one or more camera fields of view (through a horizontal window) within a generally vertical plane across the read zone of the data reader 100. The horizontal structure provides an enclosure for one or more cameras 202C, 202D, 208, active illumination elements 528 (e.g., LED assemblies), and other optical elements (e.g., lenses, mirrors, etc.) and electrical elements (e.g., cables, circuit boards, etc.) therein. Thus, the vertical housing 510 and the horizontal housing 520 may be generally orthogonal to each other. Depending on the arrangement and orientation of the different opto-electrical elements, certain elements related to providing a horizontal field of view may be physically located within the vertical structure and vice versa.

As discussed above, the data reader 100 may include one or more different types of imagers, such as monochrome imagers and/or color imagers. For example, vertical monochrome cameras 202A, 202B may be configured to capture monochrome images through the vertical window of the data reader 100. Likewise, horizontal monochrome cameras 202C, 202D may be configured to capture monochrome images through the horizontal window of the data reader 100. Vertical color camera module (CCM) 206 may be configured to capture color images through the vertical window of the data reader 100. Likewise, horizontal color camera module (CCM) 208 may be configured to capture color images through the horizontal window of the data reader 100.

The data reader may further include a main board 530 and a multi-port network switch 540. As shown herein, the main board 530 and the multi-port network switch 540 may be physically housed within the horizontal housing 520. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 530 and/or the multi-port network switch 540 to be physically located within the vertical housing 510. In such an embodiment where one of the multi-port network switch 540 or the main board 530 is physically located within the vertical housing 510 and the other is physically located within the horizontal housing 520, the two boards may be oriented orthogonal to each other similar to the orientation of the windows. The ports may be at least somewhat aligned in the orthogonal direction to accommodate easy connection of network cables therebetween.

The main board 530 may be operably coupled with the vertical monochrome imagers 202A, 202B and the horizontal monochrome imagers 202C, 202D. These connections may be via a communication interface (e.g., a MIPI interface). The main board 530 may have decoding software embedded therein such that one or more on-board processors 535 may receive monochrome images to perform decoding on the optical indicia and provide the decoding result to the POS system 214 operably coupled thereto to complete a transaction. The one or more on-board processors 535 may also be configured to provide control (e.g., coordination or synchronization) of the various components of the system including camera exposure and timing of active illumination assemblies 518, 528 of the system. It is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

As an example, the one or more on-board processors 535 may include a system processor 536 configured to control system operations (e.g., illumination/camera exposure control) as well as perform certain analysis operations (e.g., barcode decoding). The one or more on-board processors 535 may also include image processor(s) 537 configured to receive and format image data from the cameras 202A-202D before being received by the system processor 536. In some embodiments, multiple image processors may be present such that each camera 202A-202D may have its own image processor associated therewith. In some embodiments, cameras may share an image processor for transmission to the system processor 536. For example, a single image processor may be configured to combine (e.g., concatenate) the image data from each of the monochrome cameras 202A-202D for the system processor to receive multiple views at a single point in time through one input.

The one or more on-board processor 535 may also include the TPU 212 that may be configured as an AI accelerator module 138. The AI accelerator module 138 may include a tensor processing unit (TPU) configured to run artificial intelligence or other neural network machine learning models from an on-board processor (e.g., ASIC) disposed locally on the main-board 530 within the system. As an example, the TPU 212 may be implemented with a Coral Mini PCIe Accelerator or other similar TPU products available from Google Inc. of Mountain View, California configured to perform local AI functionality to the on-board system using the TensorFlow open-source software library for machine learning and artificial intelligence. Such a PCIe accelerator may be a PCB card inserted directly into a mini PCIe slot connector located on the main board 530. In some embodiments, the TPU 212 may be installed directly on-board such as the Coral Accelerator Module which is a solderable multi-chip module including the Edge TPU available from Google Inc. of Mountain View, California Other types of connections are contemplated, including a USB connected AI accelerator inserted into a USB slot. An example of such an TPU 212 is the USB accelerator available from Google Inc. of Mountain View, California. In some embodiments, the TPU 212 may be physically disposed within the vertical housing 510 and connected to the main board 530 via an extension cable having a connector that is inserted into the corresponding port (e.g., mini PCIe slot, USB slot, etc.). In some embodiments, the TPU 212 may be physically disposed within the horizontal housing 520 and connected to the main board 530 via an extension cable having a connector that is inserted into the corresponding port (e.g., mini PCIe slot, USB slot, etc.).

The multi-port network switch 540 may be operably coupled to vertical CCM 116 and horizontal CCM 208 located within the data reader 100. The multi-port network switch 540 may also be operably coupled with main board 530 located within the data reader 100. Multi-port network switch 540 may also be operably coupled to the power source 550 as well as peripheral devices such as the TDR 204, peripheral cameras 210A, 210B, and/or the remote servers 216-222. As shown, the POS 214 may be coupled directly to the main board 530. Such a connection may be via communication interfaces such as USB, RS-232, or other such interfaces. In some embodiments, the POS 214 may be coupled directly to the multi-port network switch 540 if so enabled (e.g., as an ethernet connected device).

The multi-port network switch 540 may be implemented on a separate board from the main board 530. The multi-port network switch 540 may include a plurality of ports to provide advanced network connectivity (e.g., Ethernet) between internal devices within the data reader 100 and external devices from the data reader 100. Thus, the multi-port network switch 540 may provide an Ethernet backbone for the elements within the data reader 100 as well as for external devices coupled to the data reader 100 for control and/or managing data flow or analysis. As an example, multi-port network switch 540 may be implemented with a KSZ9567 Ethernet switch or other EtherSynch® product family member available from Microchip Technology Inc of Chandler, Arizona or other similar products configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100.

Image data (e.g., streaming video, image frames, etc.) from the color cameras 206, 208 may be routed through the multi-port network switch 540 to the processing/analysis modules located internal to the data reader 100 such as the one or more on-board processors 135 supported by the main board 530. Similarly, from the TDR 204 and any peripheral cameras 210A, 210B may be routed through the multi-port network switch 540 to the processing/analysis modules located internal to the data reader 100 such as the one or more on-board processors 535 supported by the main board 530. Image data from the monochrome cameras 202A-202D may be sent to the processing/analysis modules internal to the data reader 100 such as the one or more on-board processors 535 supported by the main board 530. If coupled directly to the main board 530, such monochrome images may be received by the main board 530 without being routed by the multi-port network switch 540.

Some analysis may be performed by the system processor 536, such as decoding indicia (e.g., 1D barcodes, 2D barcodes, watermarking, OCR, etc.) identified within the images. Thus, in some embodiments, barcode decoding may be performed on the monochrome images (e.g., received from the MCs 112, 114, 122, 124) and/or color images (e.g., received from the CCMs 116, 126 through switch 140) captured internally within the data reader 100, 200 by the one or more processors 135 (e.g., system processor 136) supported by the main board 130. In some embodiments, barcode decoding may be performed on the monochrome images and/or color images captured externally from the data reader 100, 200 (e.g., received from the TDR 152, peripheral cameras 154, 156 through switch 140) by the one or more processors 135 (e.g., system processor 136) supported by the main board 130.

Other analysis may be performed by the AI accelerator 138 located on the main board 130. In some embodiments, complex analysis (e.g., AI, neural network machine learning, OCR, object recognition, item validation, produce recognition, analytics, decoding, etc.) may be offloaded to the AI accelerator 138 located on-board the main board 130. Such image analysis may be performed locally by the AI accelerator 138 on the color images captured internally within the data reader 100, 200 (e.g., received from the CCMs 116, 126 through switch 140), on the monochrome images captured internally within the data reader 100, 200 (e.g., received from the MCs 112, 114, 122, 124), and/or image data captured by external devices (e.g., received from the TDR 152, peripheral cameras 154, 156 through switch 140).

The results of such analysis by the AI accelerator 138 may be transmitted to the system processor 136 for further analysis in some embodiments. The system processor 136 may analyze such results to control certain features, such as generate alerts, trigger additional image capturing, perform analytics, or perform other system actions (e.g., forward results to POS system 160). The results of such analysis by the AI accelerator 138 may be transmitted via the multi-port network switch 140 to the remote server 158 for further analysis in some embodiments. The remote server 158 may likewise perform analysis on such results generated by the AI accelerator 138 located on-board the main board of the data reader 100, 200.

Image data from the color cameras 206, 208 may also be routed through the multi-port network switch 540 to external devices, such as remote servers 216-222 or other similar devices including any network enabled POS systems. As such, image analysis (e.g., AI, machine learning, OCR, object recognition, item validation, produce recognition, analytics, etc.) may be performed on the color images externally to the data reader 100 by external devices coupled through the multi-port network switch 540. Such color images or other data stream may be routed directly to the network connected external devices through the multi-port network switch 540 without first being received by the main board 530 (if at all).

Image data from the monochrome cameras 202A-202D may also be routed through the multi-port network switch 540 to external servers 216-222 or other similar devices including any network enabled POS systems. As such, image analysis (e.g., AI, machine learning, OCR, object recognition, item validation, produce recognition, analytics, etc.) may be performed on the monochrome images externally to the data reader 100 by external devices coupled through the multi-port network switch 540. Such monochrome images or other data stream may be routed to the network connected external devices to the multi-port network switch 540 after first being received by the main board 530.

Image data from the TDR 204 or other external peripheral cameras 210A, 210B may also be routed through the multi-port network switch 540 to external devices, such as remote servers 216-222 or other similar devices including any network enabled POS systems. As such, image analysis (e.g., AI, machine learning, OCR, object recognition, item validation, produce recognition, analytics, etc.) may be performed on these images externally to the data reader 100 by external devices coupled through the multi-port network switch 540. Such images or other data stream may be routed directly to the network connected external devices through the multi-port network switch 540 without first being received by the main board 530 (if at all).

Figure 6:
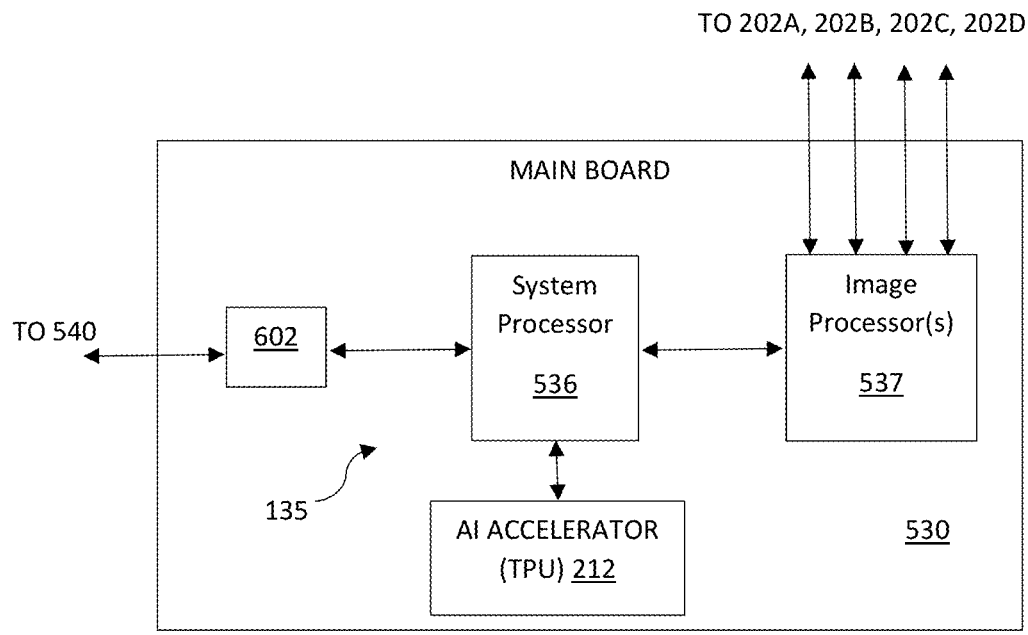
FIG. 6 is a simplified block diagram of certain components mounted on the main board according to an embodiment of the disclosure.

FIG. 6 is a simplified block diagram of certain components mounted on the main board 130 according to an embodiment of the disclosure. In particular, further details are provided regarding the one or more processors 135 which may include an Ethernet physical layer 402, a system processor 136, an image processor 137, and an AI accelerator 138. The system processor 136 may be coupled to each of the Ethernet physical layer 402, the image processor 137, and the AI accelerator 138. The Ethernet physical layer 602 coupled with the multi-port network switch 540 to provide an interface between the main board 130 and the multi-port network switch 540.

The image processor 537 may be configured to receive and format image data from the cameras 202A-202D before being received by the system processor 536. In some embodiments, multiple image processors may be present such that each camera 202A-202D may have its own image processor associated therewith. In some embodiments, cameras may share an image processor for transmission to the system processor 536. For example, a single image processor 537 may be configured to combine (e.g., concatenate) the image data from each of the monochrome cameras 202A-202D for the system processor 536 to receive multiple views at a single point in time through one input.

Image data that may be provided to the TPU 212 may be received from the system processor 536. Such image data may be captured by devices connected to the multi-port network switch 540, such as from the color camera modules 206, 208, the TDR 204, or other peripheral cameras 210A, 210B. Image data may also be received by the TPU 212 that is captured by devices connected to the main board that bypass the multi-port network switch 540, such as from the monochrome camera modules 202A-202D.

Figure 7:
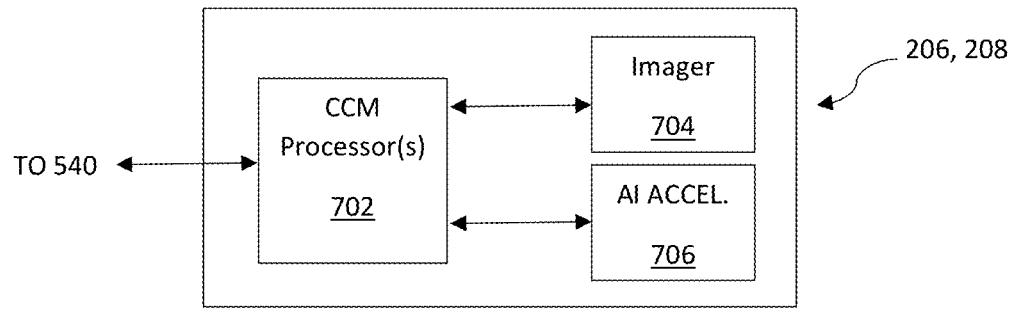
FIGS. 7-9 are different simplified block diagrams of the various imager modules according to an embodiment of the disclosure.
Figure 8:
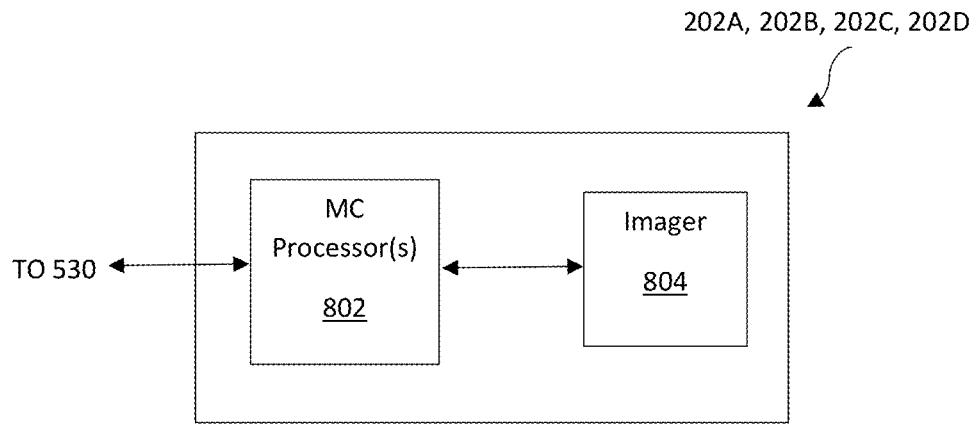
Figure 9:
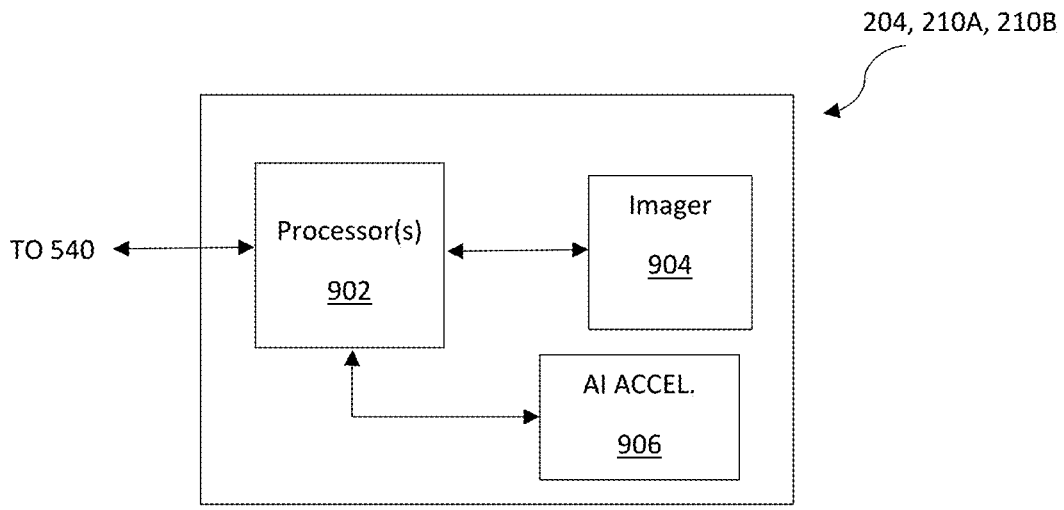

FIGS. 7-9 are different simplified block diagrams of the various imager modules according to an embodiment of the disclosure. For example, FIG. 7 may refer to one of the color camera modules 206, 208, FIG. 8 may refer to one of the monochrome camera modules 202A-202D, and FIG. 9 may refer to one of the TDR 204 or peripheral cameras 210A, 210B as examples. At least some of these camera modules may include their own on-board AI accelerator (TPU) that may be ed with other on-board components and processors. Examples are provided in which the color camera modules, TDR, or peripherals may include an on-board AI accelerator separate from that located on the main board, whereas the monochrome cameras do not include an AI accelerator. It is contemplated that monochrome cameras may include an AI accelerator while other cameras do not.

Referring to FIG. 7, the color camera module 206, 208 may include a CCM processor 702 that couples to a color imager 704 and to the multi-port network switch 540. The CCM processor 702 may include one or more processors that perform different functions, such as control, formatting, and/or certain analysis functionality, etc.

In some embodiments, the color camera module 206, 208 may also include an AI accelerator 706 on-board the color camera module 206, 208. In some embodiments, the AI accelerator 706 may be surface mounted directly on the PCB of the color camera module 206, 208 along with the CCM processor 702 and the imager 704. The AI accelerator 706 of the color camera module 206, 208 may perform similar operations as described herein regarding the AI accelerator 212 of the main board 530. Having the AI accelerator 706 directly on-board with CCM processor 702 may provide latency advantages.

Referring to FIG. 8, the monochrome camera module 202A-202D may include a MC processor 802 that couples to a monochrome imager 804 and to the main board 530 directly, however, it is also contemplated that the monochrome imagers 804 may be connected to the multi-port network switch 540. The MC processor 802 may include one or more processors that perform different functions, such as control, formatting, and/or certain analysis functionality, etc.

Referring to FIG. 9, the TDR 204 or other peripheral cameras 210A, 210B may include a processor 902 that couples to an imager 904 (e.g., color and/or monochrome depending on application) and to the multi-port network switch 540. The processor 902 may include one or more processors that perform different functions, such as control, formatting, and/or certain analysis functionality, etc.

In some embodiments, the TDR 204 or other peripheral cameras 210A, 210B may also include an AI accelerator 906 on-board the color camera module 116, 126. In some embodiments, the AI accelerator 906 may be surface mounted directly on the PCB of the color camera module along with the processor 902 and the imager 904. The AI accelerator 906 of the camera module may perform similar operations as described herein regarding the AI accelerator 212 of the main board 530. Having the AI accelerator 906 directly on-board with processor 902 may provide certain latency advantages.

Embodiments of the disclosure include a fixed retail scanner configured to provide image and/or video content to remote devices and/or remote systems. The fixed retail scanner is configured to annotate real-time image data from a transaction at the fixed retail scanner to provide additional inputs and enhancements that are added to the content delivered to remote processing and analysis systems.

Annotated content may include one or more of the following enhancements to the image data:

Timestamped images: In some embodiments, all frames may be time stamped whereas in some embodiments the processor of the fixed retail scanner may determine a selected subset of frames of the image data of particular interest. Such a determination may be based on local analysis of the image frames.

Tagging image frames responsive to events of interest detected by the processor of the fixed retail scanner analyzing the image data locally in real-time. For example, the processor of the fixed retail scanner may detect motion that is opposite the proper flow direction (e.g., excess backward motion) after a successive barcode read. Another event may include little or no backward motion when no barcode has been read. Another event may include color or weight variances versus expected product information. For example, if the processor decodes a barcode for a particular product but the image data is determined to not have the appropriate color expected for that product, the appropriate images may be annotated to reflect this color variance. Similarly, if the processor decodes a barcode for a particular product but the weight data from the scanner scale does not have the appropriate weight expected for that product, the appropriate images may be annotated to reflect this weight variance. Another event may include an indication that the operator's hands are too close to a detected barcode (or partial barcode), which may be an indication that the operator is trying to obscure a barcode or perhaps that the operator is holding onto a fake barcode that is not attached to the product. Another event may include the processor detecting a shiny region near the detected barcode, which may be an indication that a fake barcode has been taped on by a customer. Another event may include detecting adjoining items or detecting multiple item events for items passing through the field of view too close together. Additional events are also contemplated. The related frames of the image data may be annotated with the information related to the event, which may be used by a remote system to quickly isolate and review in real time or at a later point in time for fraud detection, analytics purposes, artificial intelligence training, or other purposes desired by the retail location. Such frames may be categorized such that they may be grouped and filtered in searches and grouped with other similarly annotated frames across multiple transactions for analysis or manual inspection.

A barcode within a frame may be annotated (e.g., with a bounding box or other shape surrounding the barcode or other way to indicate barcode location, annotating the segment centroid, barcode orientation, etc.) with the image data.

Non-barcode object data (e.g., bounding box, centroid identification, etc.) may also be annotated within the image data, such as logos, text, expiration dates, nutritional information (e.g., as a group or annotations of specific highlighted ingredients) or other information of interest from the image data related to a product that may be tagged by an annotation for further analysis by a remote system or manual review.

In some embodiments, frames may be annotated by tagging of frames with high segment counts without a successful read (indicating possible sweetheart detection).

In some embodiments, frames may be annotated with indicating vector movement of an object of interest within successive frames.

In some embodiments, frames may be annotated with a measured or estimated object volume within the frame.

In some embodiments, frames may be annotated with a measured or estimated distance of the object from an imager of the system. Such distance may be determined with stereo computation with two cameras in a stereo arrangement, via time-of-flight measurements, or other related methods.

In some embodiments, frames may be annotated with a size of a detected object of interest within the frame (e.g., in pixels and/or calculated from distance information to provide a relative actual size).

In some embodiments, frames may be annotated with information related to background image detection and/or sending of only changed pixels from the determined "background."

In some embodiments, only the foreground objects within the image data may be included such that background objects may be filtered out. Such filtering may provide privacy benefits for customers that may be in the background of a camera view but within the field of view. In such embodiments, annotations may be based only on such foreground objects.

In some embodiments, some annotation data may include information obtained from one camera view that is then provided as annotation data within another camera view. For example, image data from an overhead camera combined with image stream of cameras within the scanner housing. The result may be an annotated video feed for the overhead view that is overlayed with information derived from the cameras within the scanner (e.g., barcode data, a product image, exception data, event data, etc.) as well as other information (e.g., customer information, clerk information, etc.) that may be useful for having within the same video feed. As a result, a manual reviewer (or AI system) may have relevant information from the transaction within a single video feed of the overhead security footage along with time correlated transaction data as annotations derived from the image data of the other camera views.

In some embodiments, frames may be annotated with information related to objects of interest other than the product being purchased. For example, the processor may detect objects such as the operator's hands or fingers as they move through the field of view of a particular imager. Such objects may be located within the frame and annotations provided that identify the type of object as well as the location of the object within the frame(s). Such annotations may be provided by highlighting (e.g., tagging, bounding box, etc.) within the image frame(s).

In some embodiments, frames may be annotated with POS data. For example, some data from the coupled POS system (e.g., information identifying the POS system, price data, etc.) may be provided to the data reader and added as annotations to the image data (i.e., frames).

In some embodiments, frames may be annotated with employee information. For example, an employee name or other ID may be annotated to the image data to provide such information to the external system or other internal system for further analysis or review.

In some embodiments, frames may be annotated with customer information. For example, customer information (e.g., loyalty card information) may be retrieved (e.g., from the data reader, the POS system, or other connected device) which then may be annotated to the image data to provide such information to the external system or other internal system for further analysis or review.

In some embodiments, frames may be annotated with camera names indicating which imager was used for the particular view of the frame (e.g., "right horizontal camera," "left horizontal camera," "right vertical camera," "left vertical camera," "horizontal CCM," "vertical CCM," "TDR camera," "peripheral camera," "security camera," etc.). In some embodiments, the annotation may indicate the particular data reader if in a retail location that has multiple data readers (e.g., "lane 5, right horizontal camera," "self-checkout station 1, horizontal CCM," etc.). Each imager within each data reader may have a unique ID (e.g., MAC address) that is mapped within the retail location to pinpoint exactly which imager within a specific data reader captured the image.

In some embodiments, frames may be annotated with information related to the color/saturation/sensor histogram thresholds (e.g., similar to triggering cell phone mode) in combination with background variance from other views (e.g., TDR or horizontal). Complete camera views may be highlighted when the customer is too close to a camera and needs to pull back. This annotation may also link to an audible .wav prompt e.g. "reposition item over the horizontal window" or "item too close to TDR/Vertical window" with some warning lights. Scale gate information may also be useful in this situation. Thus, the need for annotations may also trigger certain alerts to the clerk and/or customer.

In some embodiments, frames may be annotated with information related to a second item that is located in the composite image if the second item enters or is discovered during an item scanning session already underway. For example, if the user starts to scan an object but covers the barcode within the scan volume with one hand, but then with the other hand presents a different item. In such a situation, the second item must enter the FoV with different motion vectors and different origination points. Such a detection may trigger an event that is then annotated within the associated image data.

In some embodiments, frames may be annotated with information related to a complete self-checkout or POS system (e.g., overhead security camera) tracking the item flow from the cart/basket/input area to the scanning area to bagging locations. Annotations may include exceptions detected by the full system (e.g., cart items go directly to bagging area or new, unexpected items in bagging area not seen in either input or subsequent scanning views) which may be highlighted by the annotations within the image data. Another embodiment may include the scanner being disabled while the POS system is in payment mode of the transaction, but overhead cameras detect items still being present in the cart/basket/input area or are passed over the scanner and show up in the bagging area. Such an annotation may be provided with image data sent to the external system or other internal system for further analysis or review.

In some embodiments, frames may be annotated with diagnostic information in certain situations related to camera or system health, such as detecting complete views or cameras which have drastic/unexpected changes in pixel histograms relative to other camera views in the composite image. Such an annotation may be provided with image data sent to the external system or other internal system for further analysis or review.

In some embodiments, frames may be annotated with exception alerts. For example, annotations may be provided when exceptions are determined, such as no read barcodes, no item in database, or other fraudulent type events such as mis-match (e.g., mismatch in one view in OCR data not matching barcode data, watermark data not matching barcode data, weight data not matching, etc.). Such an annotation may be provided with image data sent to the external system or other internal system for further analysis or review.

Annotations may be provided as overlays with the image data and/or metadata that is read by the remote system and/or viewable by a manual reviewer. In some embodiments, certain annotations may be provided to display devices such as the POS system, a customer display, etc. For example, a customer-facing electronic display may be provided showing the customer one or more fields of view of the imagers (e.g., a color imager) and the annotations may include a recommended scan region that may assist a customer to scan the items during self-checkout. Such annotations may also be helpful for a checkout clerk during use and/or during training exercises.

Annotations may be applied to the image data by the data reader prior to transmission to the external system. For example, in some embodiments, the analysis and/or annotations may be applied to the image data by the one or more on-board processors 535 (e.g., system processor 536, image processor(s) 537, TPU 212) of the data reader (see FIGS. 5, 6). In some embodiments, the analysis and/or annotations may be applied to the image data by on-board processors of the camera modules within the data reader such as the CCM processor 702 and/or AI accelerator 706 (see FIG. 7) and/or the MC processor 802 (see FIG. 8). In some embodiments, the analysis and/or annotations may be applied to the image data by on-board processors of the camera modules connected as peripherals to the data reader such as any processors 902 and/or AI accelerators 906 that may be present within the TDR or peripheral cameras (see FIG. 9). Such annotated image data may be analyzed locally in real time by local AI accelerators and/or provided to displays for inspection with the image data by the user (e.g., clerk, customer, other store personnel, etc.). In some embodiments, such annotated image data may be transmitted to external services coupled to the data reader via the multi-port network switch. For certain annotated image data (e.g., analysis/annotations provided by on-board processing resources of the camera modules), such data may be provided directly to the external services without passing through the local processing resources on the main board of the data reader. In some embodiments, some annotations may be provided by some processors (e.g., CCM resources), and then additional annotations may be provided by other processors (e.g., system resources on the main board). The combination of the different annotations may be added to the image data in real-time for further processing, analysis, storage, inspection, or other review. In some embodiments, at least some annotations may be applied to the image data by the POS system or the external system itself if the image data and the data for the annotations are provided separately and then combined later in the stage of processing (e.g., at the remote servers, POS system, etc.).

In some embodiments, the processor may generate a 3D composite image of an object based on the images received from each of the different camera views within the data reader 100. The 3D composite may be generated within the processor of the data reader 100 from images captured at substantially the same time by the different imagers, and then provided to the remote system with such annotations described above.

In some embodiments, an additional specific ethernet API may be established for the remote system to request such information (real-time video access and/or annotated image data) on a specific scanner basis and/or on varying enterprise levels (e.g., store, region, country). Access to such an API may be based on subscription/payment. For example, the data reader 100 may provide different ports for full video speed (e.g., 30 fps) or lower video speed (e.g., less than 30 fps) and access may be granted to a particular port based on subscription tier. In another example, the same physical port may be used to provide different image data access to the remote system based on subscription tier. Likewise, customers may subscribe to receive different types of annotated data with the data stream with certain annotation types being provided depending on a subscription tier. Thus, a first set of annotations may be provided to customers having a first subscription type, and a second set of annotations may be provided to customers having a second subscription type. Certain subscriptions may include both the first set and the second set of annotations being provided to the image data stream.

In some embodiments, the different video streams provided to the remote system(s) may be a subset of views of the different imagers of the data reader. For example, the processor may select two of the views for transmission to an external system while ignoring other views. The decision on which views (i.e., image data from a particular imager view) is transmitted to the remote system may be set by the customer in advance or in real-time. For example, the remote system may instruct the data reader which view is desired at a given time and may switch from time to time as desired. As an example, the remote system may request image data from the horizontal CCM with applicable annotations during a first period of time, and then request image data from the TDR with applicable annotations during a second period of time, and then request image data from one or more of the monochrome cameras with applicable annotations during a third period of time. Of course, some embodiments may have sufficient bandwidth for all image data from all camera views to be transmitted with the applicable annotations as desired.

In some embodiments, a processor (e.g., system processor) of the data reader may switch views on the fly to send annotated image data to the remote system based on predetermined criteria. For example, if one view (e.g., horizontal left camera) detects a barcode or other event of interest (e.g., motion in background, backward motion, etc.), that view may be transmitted to the remote system for a period of time before switching to another view (e.g., vertical right camera)

when a different criteria is met. Multiple views may be transmitted together, such as image data from imagers 1 and 4 at a first time, imagers 1 and 3 at a second time, imagers 2 and 4 at a third time, and so on.

In some embodiments, a retail location may have multiple data readers (e.g., multiple checkout lanes, self-checkout station, etc.) each of which has multiple camera views operating at a given time. In some embodiments, the multiple data readers within the retail location may be networked and/or coupled to a common remote system. In such an embodiment, the customer may desire only a subset of views from among a subset of data readers at that retail location at a given time. For example, 10 lanes may be present in a retail location, each of which may have 6 imagers within the respective data readers. Rather than sending image data from 60 imager views at a time, a subset of image views from among the different data readers may be transmitted at a time. The determination may be managed automatically by the individual data readers detecting events of interest (e.g., barcode read, hands in a particular location relative to barcode, excessive backward motion, etc.) and/or by the remote system. As a result, the amount of saved data may be reduced and easier for remote analysis systems to analyze or manual operators to review. In some embodiments, the views may be reduced further by the processor masking off areas of the image data that is not of interest (e.g., background) prior to transmitting to the remote system. In some embodiments, instead of full continuously running video from a selected view, a sequence of frames may be transmitted as a package (e.g., as a snapshot in time) based on a particular event.

Embodiments of the disclosure may also include the data reader being configured to concatenate image data from multiple imagers for sending synchronous (i.e., time correlated) image data from multiple imagers as a super frame for internal and/or external processing. As a remote system may have fewer access points to the image data from multiple imagers, each super frame may include image data from multiple imagers rather than coordinating transmission from each imager separately and/or store such image data in internal memory of the data reader. The image data from each sensor may be time synchronized and concatenated into a single coherent frame that includes the image data in each imager view for decoding internally (e.g., decoders in FIGS. 2-4) as well as to one or more remote systems (see, e.g., FIGS. 2-4) as a real-time video stream such that the analysis system may be provided with the same multiple views of the imagers as the decoder does. Other non-barcode scanning views (e.g., image data used for item recognition or security) may also be transmitted remotely in this manner as a separate super frame or together with barcode scanning views in a single super frame. In some embodiments, a full super frame may be transmitted to the decoder and a subset of the super frame may be transmitted to the external system, such as the situation in which only a subset of views is desired.

Figure 10:
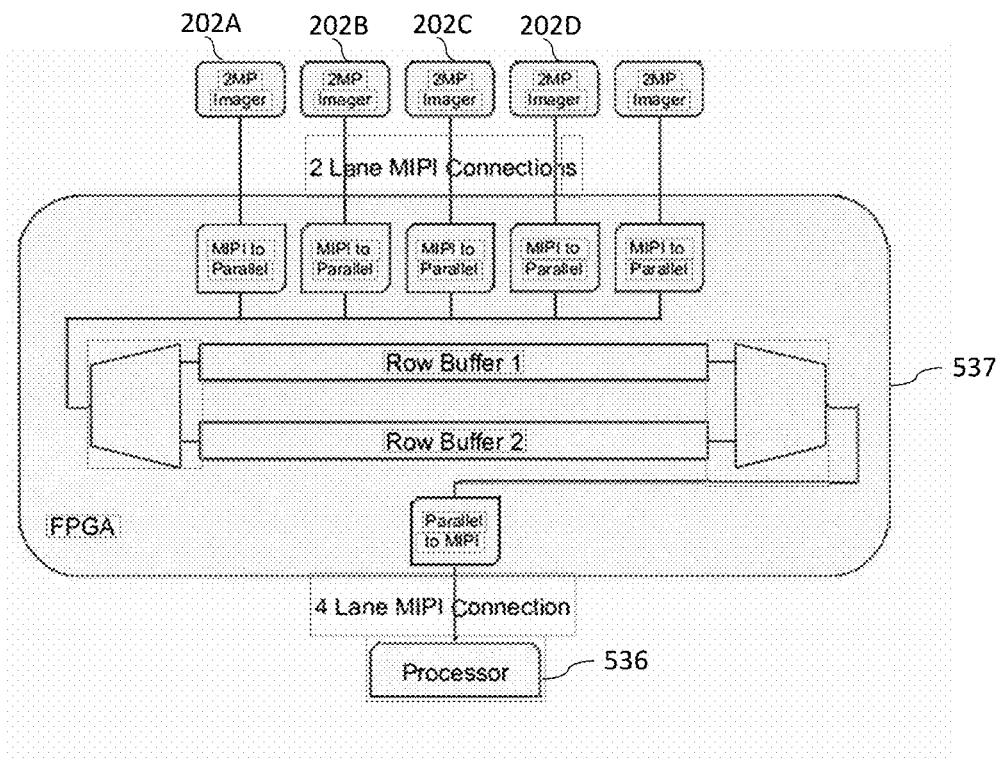
FIG. 10 is a simplified block diagram showing a method of horizontal concatenation of such image data according to an embodiment of the present disclosure.

FIG. 10 is a simplified block diagram showing a method of horizontal concatenation of such image data according to an embodiment of the present disclosure. This concatenation may be performed by the image processor 537, which may be implemented with an FPGA or other processing unit. The imagers (e.g., imagers 202A-202D) may be coupled to the image processor 537 (e.g., FPGA) that converts MIPI data to parallel data for processing by row buffers, that generates the super frame before converting from parallel data to MIPI data to the processor. This allows for real time concatenation of image sensor data without the need to have a memory store the data as would be required for vertical concatenation. This provides an improvement over conventional methods by enabling sending synchronized image data from the different views of the data reader to external systems. The image sensors may be triggered together for the "super frame" and then composed in real time to provide all time synchronized frames to the processor at once in one coherent package for internal analysis and/or transmission to external systems.

Figure 11:
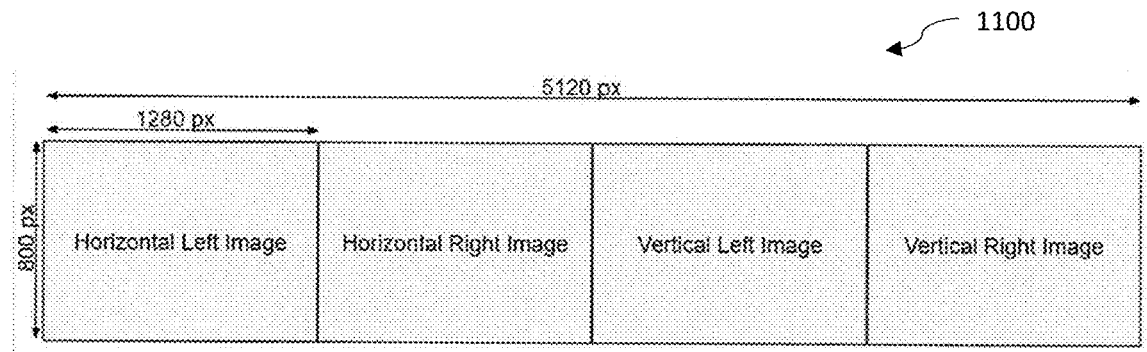
FIG. 11 shows an example of a super frame in which image data is composed from four imagers.
Figure 12:
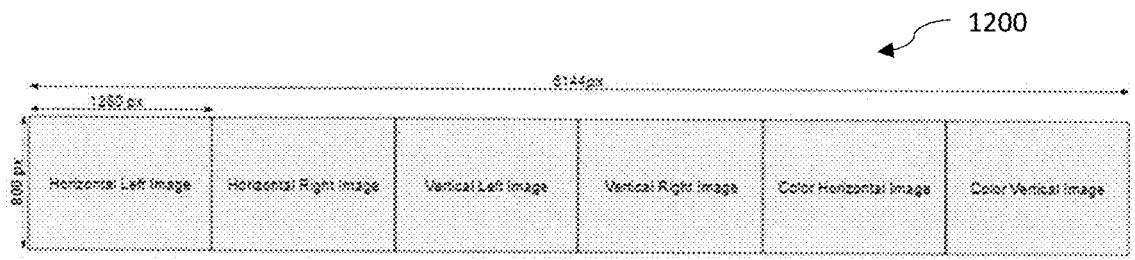
FIG. 12 shows an example of a super frame in which image data is composed from six imagers.

FIG. 11 shows an example of a super frame in which image data 1100 is composed from four imagers (e.g., horizontal left/right and vertical left/right). FIG. 1200 shows an example of a super frame in which image data 1200 is composed from six imagers (e.g., horizontal left/right, vertical left/right, and image data from vertical/horizontal color imagers). There are many combinations of image data that may be put together in this manner as well as many locations that this can be sent, each of which is contemplated as an embodiment of the disclosure.

Figure 13:
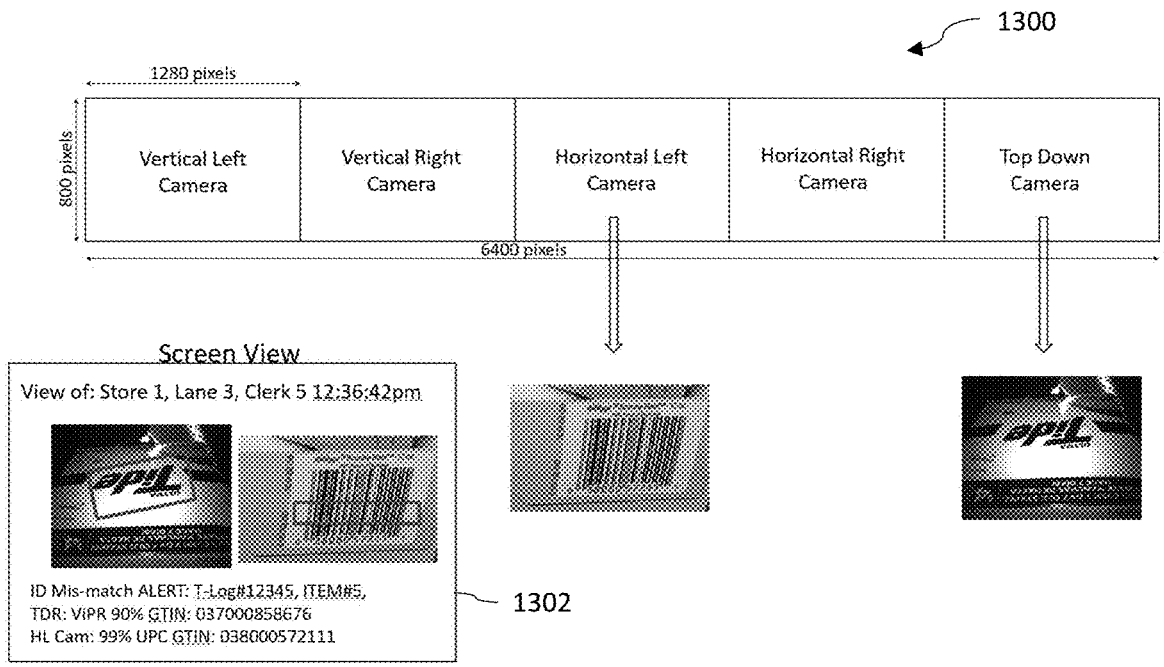
FIG. 13 shows an example of an annotation image data that may be transmitted to an external system according to an embodiment of the disclosure.

FIG. 13 shows an example of an annotation image data 1302 that may be transmitted to an external system according to an embodiment of the disclosure. As discussed above, in some embodiments the annotated information may be provided for image data of a single view, multiple views, as well as individual streams or as a super frame including some or all of the available views. In addition, different views may include different annotated information even though they may be from the same synchronized point in time.

In this example, the data reader may capture image data 1300 from different camera modules (e.g., vertical left camera, vertical right camera, horizontal left camera, horizontal right camera, top down reader). The horizontal left camera may have captured an image of a barcode and the top down camera may have captured an image of a top of a box. The processor may have determined these views to be of interest while other views may not be of interest for annotations (e.g., due to lack of data of interest, redundant annotations, unclear image data, etc.). Thus, in this example, the two images may be combined (e.g., concatenated into a super frame) that is transmitted to the external device with the appropriate annotated information.

As shown in FIG. 13, certain information may be included as annotations of the image data, including a bounding box surrounding a product logo, a bounding box showing the barcode, a time stamp, barcode GTIN data, data reader information (e.g., "store 1, lane 3"), camera information (e.g., TDR, HL Cam), employee data (e.g., "clerk 5"), and an event label which in this case is a mis-match alert indicating that the barcode and the product logo or other information do not match. Such annotations may be useful for remote analysis as well as being reproduced and organized by a display screen for manual inspection. Other annotations are also contemplated as discussed above. If other camera views (other than the two views shown in FIG. 13) were determined to have data of interest for annotations, such additional images may be provided with their respective annotations.

Additional non-limiting embodiments include:

Embodiment 1. A fixed retail scanner, comprising: one or more imagers configured to capture image data; a processor operably coupled to one or more of the imagers, the processor configured to: provide image data from at least some of the imagers in real-time during a transaction to a decoder within the data reader for decoding an optical code on an object within the image data; generate annotations for the image data based on an analysis of image content of the image data to generate annotated image data; and provide the annotated image data from at least some of the imagers to an external system in real-time during the transaction.

Embodiment 2. The fixed retail scanner of Embodiment 1, wherein fixed retail scanner is a bioptic scanner having a horizontal housing including one or more imagers and a vertical housing including one or more imagers.

Embodiment 3. The fixed retail scanner of Embodiment 1 or Embodiment 2, wherein the one or more imagers of the vertical and horizontal housings include monochrome imagers.

Embodiment 4. The fixed retail scanner of any of Embodiments 1-3, further comprising at least one color imager disposed within the horizontal housing.

Embodiment 5. The fixed retail scanner of any of Embodiments 1-4, further comprising at least one color imager disposed within the vertical housing.

Embodiment 6. The fixed retail scanner of any of Embodiments 1-5, further comprising a top-down reader including at least one color imager disposed therein.

Embodiment 7. The fixed retail scanner of any of Embodiments 1-6, wherein annotations for the annotated image data includes time stamp information.

Embodiment 8. The fixed retail scanner of any of Embodiments 1-7, wherein annotations for the annotated image data includes a tag of one or more image frames responsive to an event of interest detected by the processor including a description of the event.

Embodiment 9. The fixed retail scanner of any of Embodiments 1-8, wherein annotations for the annotated image data includes information associated with a detected barcode being identified within the image.

Embodiment 10. The fixed retail scanner of any of Embodiments 1-9, wherein annotations for the annotated image data includes non-barcode object data.

Embodiment 11. The fixed retail scanner of any of Embodiments 1-10, wherein annotations for the annotated image data includes high segment counts without a successful read.

Embodiment 12. The fixed retail scanner of any of Embodiments 1-11, wherein annotations for the annotated image data includes vector movement of an object of interest within successive frames.

Embodiment 13. The fixed retail scanner of any of Embodiments 1-12, wherein annotations for the annotated image data includes an estimate of object volume upon which an optical code is located.

Embodiment 14. The fixed retail scanner of any of Embodiments 1-13, wherein annotations for the annotated image data includes a distance measurement to a detected object.

Embodiment 15. The fixed retail scanner of any of Embodiments 1-14, wherein annotations for the annotated image data includes a size of a detected object of interest.

Embodiment 16. The fixed retail scanner of any of Embodiments 1-15, wherein annotations for the annotated image data is overlayed on the raw image data.

Embodiment 17. The fixed retail scanner of any of Embodiments 1-16, wherein the remote system is a POS host system.

Embodiment 18. The fixed retail scanner of any of Embodiments 1-17, wherein the remote system is a security system.

Embodiment 19. The fixed retail scanner of any of Embodiments 1-18, wherein the remote system is configured to identify exceptions from the annotated image data.

Embodiment 20. The fixed retail scanner of any of Embodiments 1-19, wherein the remote system is configured to perform analytics analysis from the annotated image data.

Embodiment 21. The fixed retail scanner of any of Embodiments 1-20, wherein the annotated image data includes concatenated synchronized image data from imagers from both the first set of imagers and the second set of imagers.

Embodiment 22. The fixed retail scanner of any of Embodiments 1-21, wherein the annotated image data provided to the external system is a subset of views from the data reader that is changeable over time.

Embodiment 23. The fixed retail scanner of any of Embodiments 1-22, wherein the subset of views from the data reader transmitted to the external system is changeable responsive to a real-time instruction from the external system.

Embodiment 24. The fixed retail scanner of any of Embodiments 1-23, wherein the subset of views from the data reader transmitted to the external system is changeable responsive to a real-time determination by the processor of the fixed retail scanner of meeting a pre-determined criteria.

Embodiment 25. The fixed retail scanner of any of Embodiments 1-24, wherein the subset of views from the data reader transmitted to the external system is changeable responsive to a views of other data readers being selected for transmission in real-time.

Embodiment 26. The fixed retail scanner of any of Embodiments 1-25, wherein the processor includes a system processor mounted to a main board of the fixed retail scanner and configured to generate annotations for creating the annotated image data.

Embodiment 27. The fixed retail scanner of any of Embodiments 1-26, wherein the processor includes an on-board processor of a camera module disposed within the fixed retail scanner and configured to generate annotations for creating the annotated image data.

Embodiment 28. The fixed retail scanner of any of Embodiments 1-24, wherein the processor includes an on-board processor of a camera module connected the fixed retail scanner as a peripheral camera and configured to generate annotations for creating the annotated image data to be sent to the external system via the fixed retail scanner.

Embodiment 29. The fixed retail scanner of any of Embodiments 1-24, wherein the processor includes at least one of a system processor, an image processor, an artificial intelligence accelerator, or a processor on-board a camera module, or any combination thereof that are configured to generate annotations for creating the annotated image data to be sent to the external system via the fixed retail scanner.

Embodiment 30. The fixed retail scanner of any of Embodiments 1-29, wherein the one or more imagers include monochrome imagers, color imagers, or any combination thereof disposed within a horizontal housing, a vertical housing, a top down reader, or an external peripheral camera.

Embodiment 31. A method of generating annotated image data for fixed retail scanner, the method comprising: capturing image data from a plurality of imagers during a real-time transaction in a retail environment; communicating at least some of the image data to a decoder within the data reader for decoding an optical code on an object within the image data; generating annotations for at least some of the image data based on an analysis of image content of the image data; creating annotated image data with the annotations and the image data; and transmitting the annotated image data to a remote system that is external to the fixed retail scanner for additional analysis or manual inspection.

Embodiment 32. The method of Embodiment 31, wherein generating annotations and creating annotated image data includes deriving annotation data from information obtained from one camera view that is then provided as annotation data for image data captured by another camera view to create the annotated image data.

Embodiment 33. A method of generating annotated image data employing the fixed retail scanner of any of Embodiments 1-30.

Embodiment 33. A data reading system employing the fixed retail scanner of any of Embodiments 1-30 or the methods of Embodiments 31 or 32.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner, comprising:
one or more imagers configured to capture image data; and
a processor operably coupled to one or more of the imagers, the processor configured to:
provide image data from at least some of the imagers in real-time during a transaction to a decoder within the data reader for decoding an optical code on an object within the image data;
detect an event of interest based on an analysis of image content, the event of interest being different than the decoding of the optical code;
generate annotations for the image data based on the analysis of image content of the image data to generate annotated image data, wherein the annotations for the annotated image data includes:
information associated with the object being identified within the image; and
an event label including a description of the detected event of interest; and
provide the annotated image data from at least some of the imagers to an external system in real-time during the transaction.

2. The fixed retail scanner of claim 1, wherein:
the fixed retail scanner is a bioptic scanner having a horizontal housing and a vertical housing, the one or more imagers include one or more monochrome imagers, color imagers, or any combination thereof disposed within the horizontal housing, the vertical housing, a top down reader, and/or an external peripheral camera operably coupled to the bioptic scanner, and the processor includes at least one of a system processor, an image processor, an artificial intelligence accelerator, a processor on-board a camera module, or any combination thereof that are configured to generate annotations for creating the annotated image data to be sent to the external system via the fixed retail scanner.

3. The fixed retail scanner of claim 2, wherein the annotated image data includes concatenated synchronized image data from at least one imager within the horizontal housing and at least one imager within the vertical housing.

4. The fixed retail scanner of claim 1, wherein the annotations for the annotated image data further include information associated with non-barcode object data identified within the captured image data.

5. The fixed retail scanner of claim 1, wherein the annotations for the annotated image data further include information about vector movement of an object of interest within successive frames of the image data captured by the one or more imagers.

6. The fixed retail scanner of claim 1, wherein the annotations for the annotated image data further includes at least one of a distance measurement to a detected object, a size of the detected object of interest, an object weight, or an estimate of an object volume of the object upon which an optical code is located.

7. The fixed retail scanner of claim 1, wherein the remote system is one of a POS host system, a security system, a system configured to identify exceptions from the annotated image data, or a system configured to perform analytics analysis from the annotated image data.

8. The fixed retail scanner of claim 1, wherein the one or more imagers includes a full set of imagers having a full set of available views for the fixed retail scanner, and wherein the annotated image data provided to the external system includes combining image data for a subset of views from different imagers of the data reader, the subset of views being selected from the full set of available views from the full set of imagers of the data reader, with the selection of the subset being changeable over time.

9. The fixed retail scanner of claim 8, wherein selection of the subset of views from the data reader for the combined image data from the different imagers that is included with the annotated image data transmitted to the external system is changeable responsive to a real-time instruction from the external system.

10. The fixed retail scanner of claim 8, wherein the selection of subset of views from the data reader for the combined image data from the different imagers that is included with the annotated image data transmitted to the external system is changeable responsive to a real-time determination by the processor of the fixed retail scanner of meeting a pre-determined criteria.

11. The fixed retail scanner of claim 1, wherein the event label is indicative of an exception alert including at least one of a no barcode read exception, a no item in database exception, or mismatch between the barcode data and non-barcode data as the detected event of interest.

12. The fixed retail scanner of claim 1, wherein the event label is indicative of at least one of:

detecting little or no backward motion relative to an expected flow direction when no barcode was read as the detected event of interest; or detecting excessive backward motion relative to an expected flow direction after a barcode read as the detected event of interest.

13. The fixed retail scanner of claim 1, wherein the event label is indicative of a determination that a user's hand is proximate a detected barcode as the detected event of interest.

14. The fixed retail scanner of claim 1, wherein the annotations for the annotated image data further includes data received from a point-of-sale system operably coupled to the fixed retail scanner.

15. The fixed retail scanner of claim 1, wherein the annotations for the annotated image data further includes data indicative of at least one of a customer of the transaction, a clerk assisting the transaction, which imager(s) of the one or more imagers was used to capture the image data that is part of the annotated image data, a store identifier, or a location identifier for where the fixed retail scanner is located within a store.

16. The fixed retail scanner of claim 1, wherein access to the annotated video data is restricted based on a subscription by the external remote system with different types of annotations and/or imager views being included in the annotated image data based on a subscription tier.

17. The fixed retail scanner of claim 1, wherein the external system includes a point of sale system including an electronic display configured to display the annotated image data thereon to provide real-time feedback to the user during the transaction.

18. A method of generating annotated image data for fixed retail scanner, the method comprising:

capturing image data from a plurality of imagers during a real-time transaction in a retail environment;

communicating at least some of the image data to a decoder within the data reader for decoding an optical code on an object within the image data;

detecting an event of interest based on an analysis of image content, the event of interest being different than the decoding of the optical code;

generating annotations for at least some of the image data based on an analysis of image content of the image data, wherein the annotations for the annotated image data includes:

information associated with the object being identified within the image; and an event label including a description of the detected event of interest;

creating annotated image data with the annotations and the image data; and transmitting the annotated image data to a remote system that is external to the fixed retail scanner for additional analysis or manual inspection.

19. The method of claim 18, wherein generating annotations and creating annotated image data includes deriving annotation data from information obtained from first image data captured by a first camera having a first view that is then provided as annotation data for second image data captured by a second camera having a second view to create the annotated image data, wherein the annotated image data includes the annotation data and the second image data.

20. The fixed retail scanner of claim 11, wherein the non-barcode data includes at least one of a color or weight variance relative to expected values for a product identified by the barcode data.

* * * * *